United States Patent Office 3,294,633
Patented Dec. 27, 1966

3,294,633
PROCESS OF FUMIGATION WITH THIAZYL TRIFLUORIDE
Everett E. Gilbert, Morristown, N.J., assignor to Allied Chemical Corporation, New York, N.Y., a corporation of New York
No Drawing. Filed Sept. 22, 1965, Ser. No. 489,410
1 Claim. (Cl. 167—39)

This invention relates to a process for combatting noxious insects by fumigation.

Many insect pests which infest areas and confined spaces which are difficult to reach or control by direct application of solid or liquid insecticides are readily controlled by exposure to toxic gases or vapors of compounds known as fumigants. This method is especially valuable in controlling pests in greenhouses, homes, warehouses and the like, and is especially effective in ridding stored grain of destructive pests.

I have now found that the known compound thiazyl trifluoride $$N \equiv SF_3$$

is a potent fumigant and is especially effective in destroying or controlling a wide variety of insect pests, especially such organisms as the various grain infesting insects and their larvae, wool destroying organisms and other pests. Thus I have found thiazyl trifluoride to be an effective fumigant in combatting, for example, the confused flour beetle (*Tribolium confusum*), black carpet beetle (*Attagenus piceus*), lesser meal worms (*Alphitobiues diaperinus*), yellow meal worms (*Tenebrio molitar*) and the like.

Whenever the term "insects" is used in the instant specification and claims, it is to be understood as referring to the insects in adult, pupal, nymphal, larval or egg stages.

The thiazyl trifluoride used in my invention is a known compound which has been prepared as reported by Glemser and Schröder, Z. anorg. allg. Chem. 284, 97–100 (1956), by reaction of sulfur dichloride with ammonia to produce tetranitrogen tetrasulfide, and then reacting this product with silver difluoride to form thiazyl trifluoride as shown below.

(1) $SCl_2 + NH_3 \rightarrow N_4S_4$
(2) $N_4S_4 + AgF_2 \rightarrow N \equiv SF_3$ Thiazyl trifluoride is a gas, boiling at —27° C. under normal atmospheric conditions. It can be considered to be a nitrogen analog of $SF_6$ which it resembles in thermal stability and in chemical stability under acid and neutral conditions. It is therefore surprising that thiazyl trifluoride should be an extremely active insecticidal fumigant since $SF_6$ is notable for its biological inertness.

Fumigation with thiazyl trifluoride as practiced according to my invention is carried out according to conventional fumigation practices, by exposing the organisms to the vapor of the thiazyl trifluoride. Since the thiazyl trifluoride is a gas at normal atmospheric conditions, it can conveniently be furnished in compressed or liquefied state in a tank from which the gaseous toxicant will emerge on release of a valve. The toxicant is thus introduced into the space to be fumigated or injected into the body of the material to be treated such as grain, flour or the like, thus subjecting the organisms to be controlled to the vapors of the toxicant for a period sufficient to rid the space of the pests.

The following specific examples further illustrate my invention. Parts are by weight except as otherwise noted.

*Example 1*

The effect of thiazyl trifluoride as a toxic fumigant against various insects, adults and larvae was determined by placing 10 of each test insect or larva in 1.5 inch diameter salve tins together with a small amount of appropriate food and placing the tins in separate gallon jars. Various doses of thiazyl trifluoride gas were released into each jar and the jars immediately sealed. Similar jars provided with test organisms were treated with 1,1-dichloronitroethane ($C_2HCl_2NO_2$) a highly effective fumigant ("Ethide") and other jars containing no toxicant were charged with the same number of organisms in the same manner and sealed. Exposure to the toxicant was maintained for 24 hours. The organisms were removed from the jars and were then observed, and mortality counts were made after 5 or 6 days.

Table I below shows the 6-day percent mortality after 24 hours' exposure at doses of .0125 gram of thiazyl trifluoride per gallon jar, of confused flour beetle adults (CFB) black carpet beetle larvae (BCB) and yellow meal worm larvae (YMW). Table II shows 5-day mortality of the above organisms and also of lesser meal worm adults (LMW) after 24 hours' exposure at doses of 0.0062 gram of thiazyl trifluoride per gallon jar in comparison to results with "Ethide" and with no toxicant.

TABLE I

| Compound | Percent Mortality 6 days after 24 hours' Exposure to 0.0125 gram per jar | | |
|---|---|---|---|
| | CFB | BCB | YMW |
| $NSF_3$ | 100 | 100 | 100 |
| $C_2HCl_2NO_2$ | 90 | 60 | 100 |
| No Toxicant | 0 | 0 | 0 |

TABLE II

| Compound | Percent Mortality 5 days after 24 hours' Exposure to 0.00625 gram per jar | | | |
|---|---|---|---|---|
| | CFB | LMW | BCB | YMW |
| $NSF_3$ | 100 | 100 | 100 | 100 |
| $C_2HCl_2NO_2$ | 10 | 40 | 0 | 100 |
| No Toxicant | 10 | 0 | 0 | 0 |

It will be seen from Tables I and II that thiazyl trifluoride is a potent fumigant even at very low concentrations.

While the above describes the preferred embodiments of my invention, it will be understood that departures can be made therefrom within the scope of the specification and claims.

I claim:

The process for combatting noxious insects which comprises subjecting said insects to the action of the vapors of thiazyl trifluoride.

References Cited by the Examiner

Cohen et al., Chem. Ind. (London) (1962), p. 1866.
Glemser et al., Ber. 97(b): 1704–1709 (1965).
Glemser et al., Z. anorg. u. allgem. Chem. 284: 97–100 (1956).
Glemser et al., Z. anorg. u. allgem. Chem. 287: 54–60 (1956).
Glemser et al., Z. anorg. u. allgem. Chem. 307: 313–344 (1961).
Kirchhoff et al., J. Am. Che. Soc. 84: 334–336 (1962).
Ramaswamy et al., J. Mol. Spectr. 9: 107–113 (1962).

LEWIS GOTTS, *Primary Examiner.*

S. K. ROSE, *Assistant Examiner.*